United States Patent [19]

Cannalte et al.

[11] Patent Number: 4,941,167
[45] Date of Patent: Jul. 10, 1990

[54] TELEPHONE SYSTEM WITH CUSTOMIZED CENTRAL MESSAGE CENTER

[75] Inventors: Gary A. Cannalte, Hoffman Estates; Todd Smith, Long Grove; William F. Zancho, Hawthorn Woods; Robert J. Crawford, Palatine, all of Ill.

[73] Assignee: Motorola, Inc., Schaumburg, Ill.

[21] Appl. No.: 267,484

[22] Filed: Nov. 4, 1988

[51] Int. Cl.$^5$ .................. H04M 1/57; H04M 1/64; H04M 11/08
[52] U.S. Cl. .................. 379/67; 379/59; 379/88; 379/142; 379/212
[58] Field of Search .................. 379/88, 89, 67, 211, 379/214, 212, 210, 263, 274, 58, 59, 63, 142

[56] References Cited

U.S. PATENT DOCUMENTS

| | | | |
|---|---|---|---|
| 3,870,830 | 3/1975 | Tapiei | 379/40 |
| 3,906,166 | 9/1975 | Cooper et al. | 379/60 |
| 3,927,278 | 12/1975 | Tsutsumi et al. | 379/159 |
| 4,025,853 | 5/1977 | Addeo | 325/55 |
| 4,079,212 | 3/1978 | Sasai | 379/159 |
| 4,268,722 | 5/1981 | Little et al. | 370/18 |
| 4,425,627 | 1/1984 | Eibner | 379/388 X |
| 4,476,349 | 10/1984 | Cottrell et al. | 379/212 X |
| 4,485,486 | 11/1984 | Webb et al. | 455/33 |
| 4,549,311 | 10/1985 | McLaughlin | 455/277 |
| 4,560,837 | 12/1985 | Carson et al. | 379/212 |
| 4,567,324 | 1/1986 | Smith et al. | 379/210 |
| 4,582,957 | 4/1986 | Hayes et al. | 379/74 |
| 4,588,861 | 5/1986 | Teich | 379/159 |
| 4,614,842 | 9/1986 | Smith et al. | 379/376 X |
| 4,640,992 | 2/1987 | Rose | 379/89 |
| 4,654,867 | 3/1987 | Labedz | 379/59 |
| 4,706,270 | 11/1987 | Astegiano et al. | 379/2 |
| 4,776,002 | 10/1988 | Kammerl | 379/88 |
| 4,785,408 | 11/1988 | Britton et al. | 364/513.5 |
| 4,790,004 | 12/1988 | Nalbone | 379/214 |
| 4,813,070 | 3/1989 | Humphreys et al. | 379/213 |

FOREIGN PATENT DOCUMENTS 3221683 12/1983 Fed. Rep. of Germany ........ 379/89
0202156 12/1982 Japan .................. 379/67

OTHER PUBLICATIONS

DYNTAC Cellular Mobile Telephone, Instruction Manual No. 68P81070E40-0, 1985.

Primary Examiner—Thomas W. Brown
Attorney, Agent, or Firm—Rolland R. Hackbart; F. John Motsinger

[57] ABSTRACT

A telephone system employs a novel message system for calling parties. The switch controller includes selectable and programmable announcement machines, while the telephone devices include indicators which allow call transferees the ability to determine the reason the call was transferred, e.g., the called telephone was busy, did not answer or the called telephone party is in conference. When desired, a telephone party is capable of programming the switch controller to reply to any particular incoming phone calls with one of a number of customized or preselected messages.

5 Claims, 4 Drawing Sheets

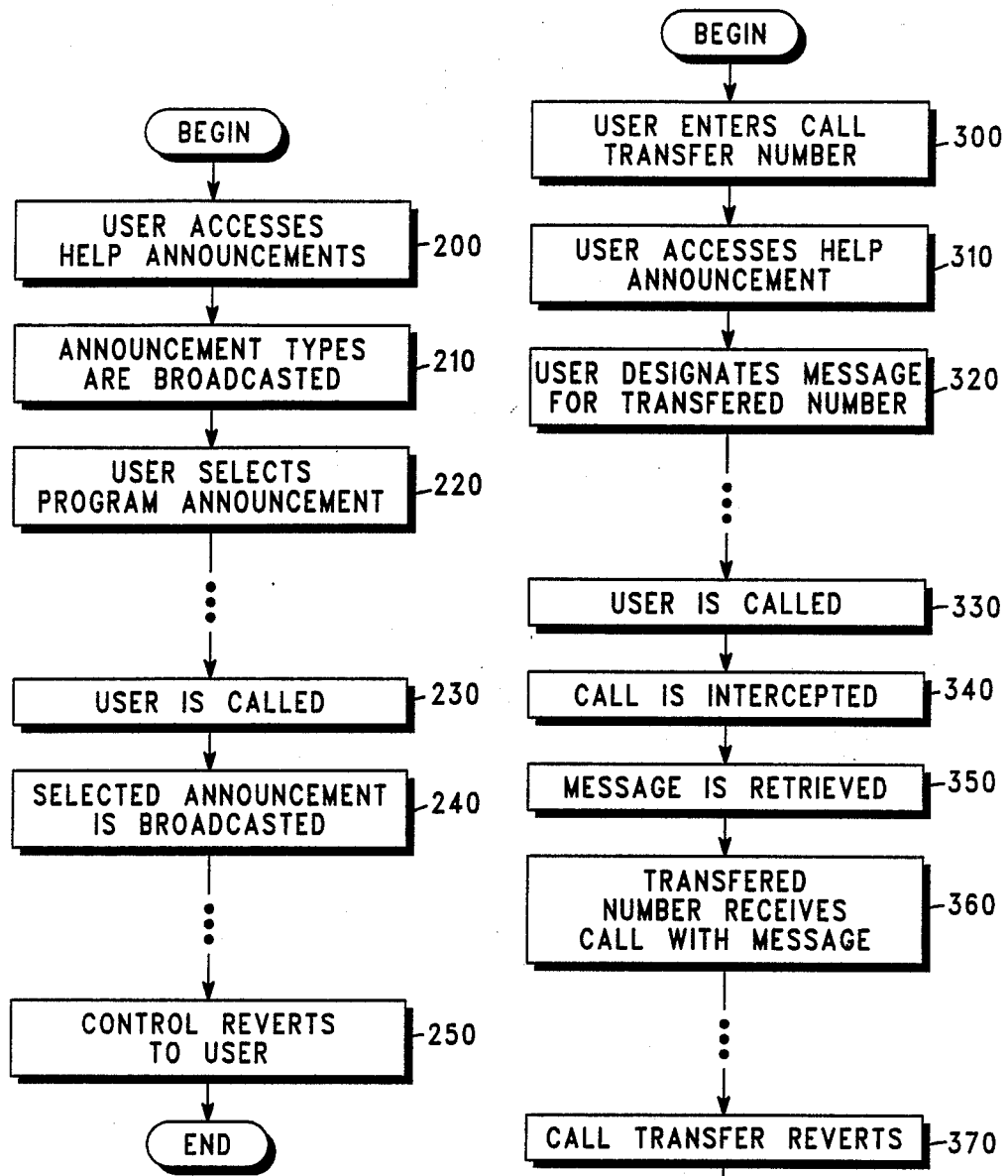

TELEPHONE SYSTEM WITH CUSTOMIZED CENTRAL MESSAGE CENTER

FIELD OF THE INVENTION

The present invention relates generally to telephones, and, more particularly, to the practice of informing the telephone user of the status of the called party.

DESCRIPTION OF THE PRIOR ART

Known techniques for screening a calling party in a central office system are limited to manually operated recording implementations. The most common technique in a central office system employs a switchboard operator (secretary) to answer and screen incoming calls. In some systems, the secretary is informed of the status of the called party's phone (e.g., whether or not it is off-hook) by light indicators provided at the secretary's telephone and coupled to the called party's telephone. In other systems, e.g., cellular switches, the central switch determines if the called party's phone is busy or not answering, and automatically informs the calling party of such determined status. Unfortunately, the secretarial implementation is disadvantageous due to the manual status checking required by the secretary, while both implementations are disadvantageous due to the limited number and the quality of messages that are provided to the calling party.

In a more recent approach, telephone users are allowed to individually prerecord messages in a central recording device to instruct the calling party to leave a message. Although useful, this approach fails to provide convenient flexibility to the type of message that is pre-recorded and fails to provide special messages for system features such as call transferring.

Accordingly, there is a need for a telephone communication system which overcomes the foregoing deficiencies.

OBJECTS OF THE INVENTION

It is an object of the present invention to provide a telephone system which provides a message transfer operation which overcomes the above-mentioned deficiencies.

It is another object of the present invention to provide a telephone system which allows specific preprogrammed messages to be automatically relayed to a calling party, which messages may be customized by the called party.

BRIEF DESCRIPTION OF THE DRAWINGS

The features of the present invention which are believed to be novel are set forth with particularity in the appended claims. The invention, together with further objects and advantages thereof, may best be understood by making reference to the following description taken together with the accompanying drawings, in which reference numerals identify the elements, and wherein:

FIGS. 3a, 3b and 3c are flow diagrams which illustrate three respective operational embodiments of the system of FIG. 1, according to the present invention.

DETAILED DESCRIPTION OF THE PREFERRED EMBODIMENT

The arrangement disclosed in this specification is directed to signalling control in a radio frequency (RF) cellular radiotelephone communication system, and, more particularly, to a signalling control implementation in such a system which is capable of automatically relaying a customized message to a calling party.

Figure 1:
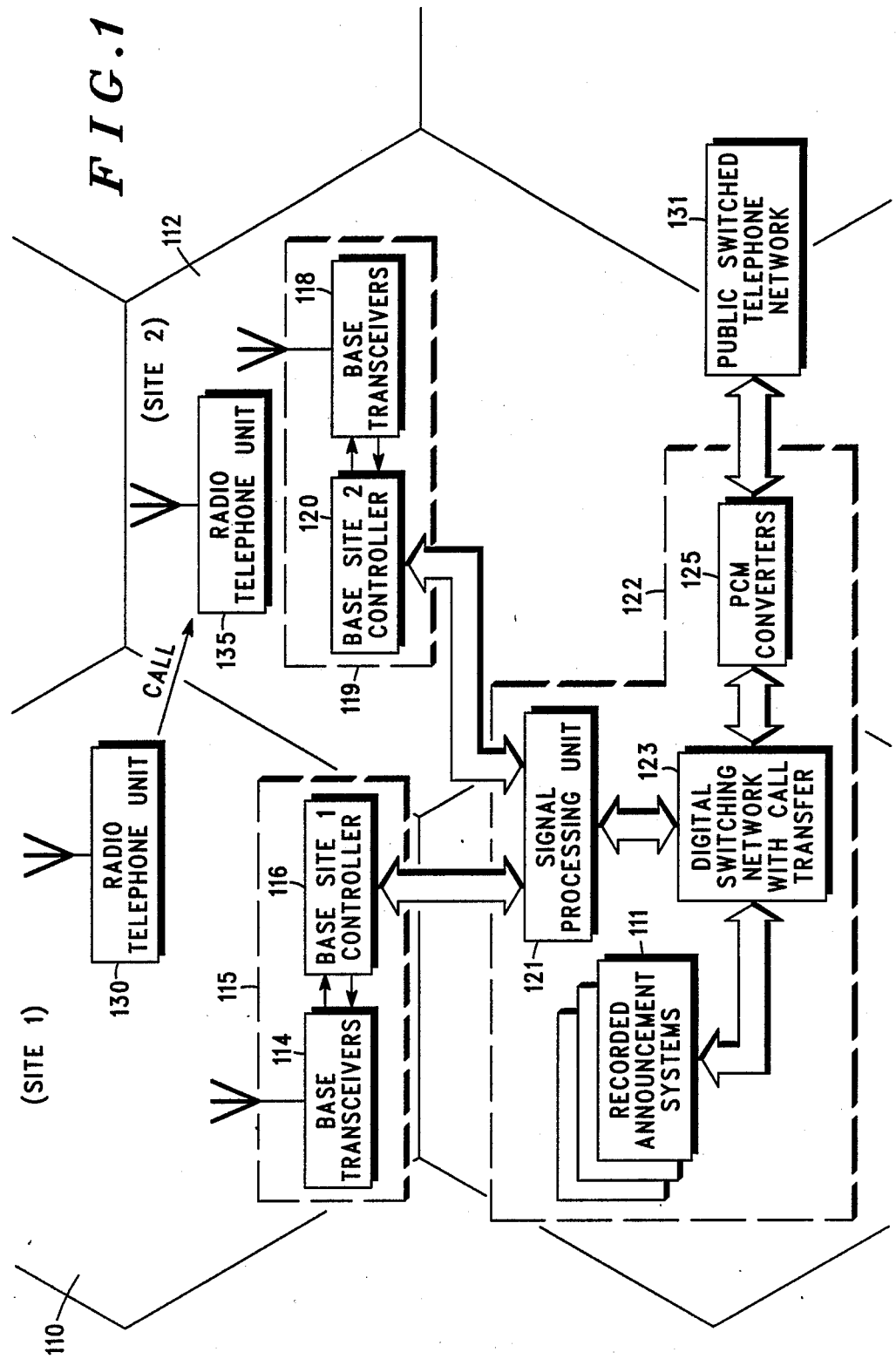
FIG. 1 is a diagram of a cellular system including two base sites and their respective equipment, according to the present invention.

FIG. 1 illustrates such a cellular communication system. The system in FIG. 1 includes base site equipment 115 and 119 for two geographic radio frequency (RF) coverage areas (cells) 110 and 112, respectively. For cell 110, the base site equipment 115 includes a set of base transceivers 114 and a base site controller 116. For cell 112, the base site equipment 119 includes a set of base transceivers 118 and a base site controller 120 with substantially identical circuitry as the base site equipment 115.

Overall control of the base site equipment 115 and 119 is provided by a signal processing unit 121 of a cellular switch controller 122. The switch controller 122 also includes a digital switching network 123 for controlling the call switching operation between a public switched telephone network (PSTN) 131 and the base site equipment 115 and 119. A set of pulse code modulation (PCM) converters 125 are included in the cellular switch controller 122 for interfacing the system to the PSTN 131. Additionally, a number of conventional digital RANNS (recorded announcement systems) 111 are included to provide prerecorded announcements to calling parties at the direction and under the control of the digital switching network 123, in accordance with the present invention. For general details of a conventional cellular system, reference may be made to "Cellular Voice and Data Radiotelephone System", Labedz et. al., U.S. Pat. No. 4,654,867. For further details of a conventional cellular switch controller, reference may be made to U.S. Pat. No. 4,268,722, Little et al. Both of the above U.S. patents are assigned to the same assignee and incorporated herein by reference.

Two radio telephone units 130 and 135 are illustrated communicating with their respective cell sites 110 and 112. As the discussion below will indicate, the radiotelephone units 130 and 135 are situated to illustrate an operation, in accordance with the present invention, for allowing the radiotelephone unit 130 (135) to call the radiotelephone unit 135 (130). The system employs a preselected prerecorded message, provided by the RANNS 111, which is automatically relayed to the radiotelephone unit 130 (135). The preselection of the prerecorded message may be performed by the called party. Before discussing this operation in more detail, a description of the radiotelephone unit 130 or 135 is provided.

Figure 2:
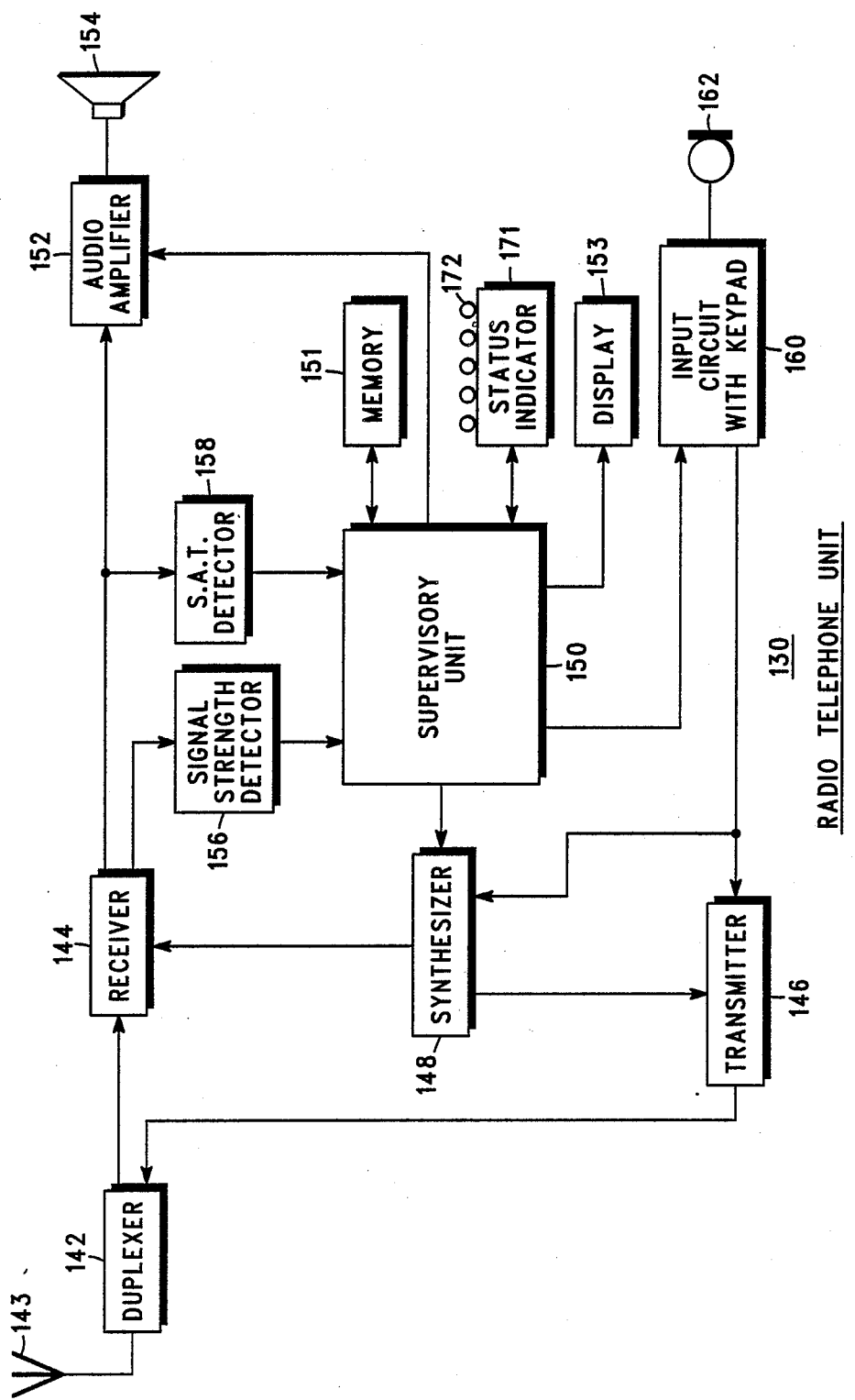
FIG. 2 is an expanded diagram of either radiotelephone unit 130 or 135 of FIG. 1, according to the present invention.

FIG. 2 illustrates an expanded diagram of the radiotelephone unit 130 or 135 of FIG. 1. The radiotelephone unit includes a conventional duplexer 142 for interfacing a receiver 144 and a transmitter 146 with an antenna 143. A synthesizer is used for providing a stable, yet programmable oscillator signal to the transmitter 146 and to the receiver 144. The intelligence control of the unit 130 is provided by a supervisory unit 150 which includes a microcomputer (not shown).

The supervisory unit 150 is used to select the frequency channels in the synthesizer at which the unit 130 will be operating and to control miscellaneous subscriber interface circuits including: an audio amplifier 152 and a speaker 154 coupled thereto; a display circuit 153 for displaying messages to the subscriber; and a microphone 162 and an input circuit 160 which includes a keypad. Additionally, coupled to the receiver 144 are a conventional signal strength detector 56, a conventional supervisory audio tone (SAT) detector 158 and a status indicator 171.

The status indicator 171 provides call transfer information to the user of the radiotelephone. For example, consider when calls are transferred from radiotelephone 130 to radiotelephone 135. Information, which is initially sourced from either the central switch 122 or the radiotelephone 130, indicates the reason the call is being transferred or indicates the status of the radiotelephone 130 (or user thereof) to the transferee radiotelephone (the telephone to which calls are transferred) 135. Upon the reception of such indication, the supervisory unit 150 accesses a look-up table in memory 151 to determine which of several L.E.D.s 172 to activate. The L.E.D.s 172 are then interpreted by the radiotelephone user (transferee) in order to appropriately handle the incoming call.

Of course, one skilled in the art will recognize that this operation can be implemented for calls to and from land line telephones using standard (non-cellular) telephone switches. Data transfer techniques such as provided by ISDN standards or CCITT signalling system protocols can accommodate this message transfer operation.

Accordingly, every block shown in FIGS. 1 and 2 represent conventional equipment operating in a conventional system except for the operational modifications described herein and the status indicator 171. For general details of such a conventional system, reference may be made to "Cellular Voice and Data Radiotelephone System", Labedz et. al., U.S. Pat. No. 4,654,867, assigned to the same assignee, which may be modified in accordance herewith. For further details of a conventional cellular switch controller, reference may be made to U.S. Pat. No. 4,268,722 Little et al., assigned to the same assignee. For further details of conventional base site equipment, reference may be made to U.S. Pat. No. 4,485,486, assigned to the same assignee. For further details of a radiotelephone unit, reference may be made to U.S. Pat. No. 3,906,166, Cooper et al., assigned to the same assignee, and to "DYNATAC Cellular Mobile Telephone Instruction Manual", Motorola Publication No. 68P81070E40, available from Motorola C & E Parts, 1313 E. Algonquin Road, Schaumburg, Ill., 60196. For details of a signal strength detector and a SAT detector (from the radiotelephone unit 130), reference may be made to U.S. Pat. Nos. 4,549,311 (assigned to the same assignee) and 4,025,853, respectively. The foregoing publications and patents are incorporated herein by reference.

FIG. 3a illustrates, through a flow chart, an operational embodiment of the present invention by the above described cell sites 100 and 112 and the switch controller 122. More specifically, FIG. 3a illustrates a preferred manner in which the called party employs the RANNS of FIG. 1 in conjunction with a conventional call transfer operation.

The flow chart of FIG. 3a begins at block 200 where the user of the telephone accesses a "help" announcement message which is prestored in the RANNS. The help announcement message informs the user of the various messages that have been prerecorded in the RANNS. Additionally, the help message indicates to the user whether or not there are any available memory areas in which a customized message may be stored for the user's telephone number. Access to the help announcement message may be provided by a designated function key which the switch controller recognizes and responds to by coupling the help message to the calling party. A unique set of sequential digits is typically provided for specialized functions.

At block 210, the switch controller broadcasts to the user the different types of announcements and the manner in which these announcements may be selected.

At block 220, the user selects one of these prerecorded announcements, or, alternatively, the user programs a customized announcement by speaking into the mouth-piece of the telephone.

At block 230, the flow chart of FIG. 3a depicts a call initiated for the user. At block 240, the switch controller is depicted broadcasting the user selected announcement to the calling party rather than ringing the called party.

At block 250, control is depicted reverting back to the user. Such reversion may be implemented by providing a termination key digit sequence which is recognizable by the switch controller.

FIG. 3b illustrates, through a flow chart, a second operational embodiment of the present invention. More specifically, FIG. 3b illustrates a preferred manner in which a telephone user activates a call transfer function along with a selected status message to the call transferee.

The flow chart of FIG. 3b begins at block 300 where the telephone user enters the call transfer mode for the system along with the call transfer number, according to conventional operation.

At block 310, the telephone user accesses the help announcement which is prerecorded in the RANNS, as discussed with the flow chart of FIG. 3a.

At block 320, in response to receiving the various types of messages which are common to the telephone users on the communication system, the user designates a particular message which will be passed to the call transferee. Such designation may be selected or programmed by voice or by keypad entry techniques.

At block 330, the flow chart of FIG. 3b depicts the user being called. At block 340, the call to the user is detected by the switch controller and, at block 350, the designated message for the transferee (which message has been recorded by the switch controller) is retrieved.

At block 360, the switch controller implements the call transfer function to the call transferee, thereby connecting the incoming call to the call transferee along with the designated message. The designated message may be passed to the call transferee, e.g., using the system illustrate in FIG. 1, by superimposing a low bit rate audio tone over the signalling channel via the cell site hosting the call transferee. One skilled in the art will recognize that there are various ways in which the phone number of the calling party may be communicated to the called party. The technique just described is merely a preferred technique that is useful for the system described with FIG. 1. Of course, other types of communication systems implementing this operation would require other ways of passing such information to the call transferee.

As an example, consider two telephone devices in an office area telephone communication system. In such a system, consider a first telephone call-transferring to a second telephone. The party handling the call transferer's calls does not typically know why the calls are being transferred. Thus, when a call that is originally designated for the transferer is received at the call transferee's telephone, the party handling the call, in accordance with previous systems, generally attempts to track down the call transferer to determine how to respond to the calling party. Using the present invention, in accordance with the operational embodiment of FIG. 3b, the message that is passed to the call transferee is used to inform the call transferee of the reason that the call was transferred. For example, such a message might be "in conference", "out to lunch", "out for the day", "busy", etc.

A block 370 of FIG. 3b, the flow chart depicts the call transfer function reverting back to the user.

Figure 3C:
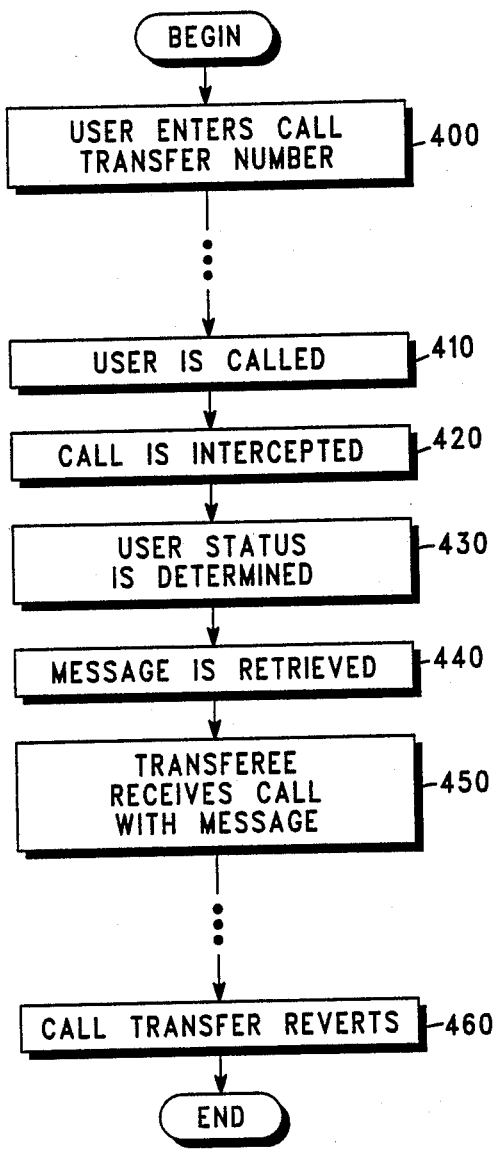

FIG. 3c illustrates, also through a flow chart, a third operational embodiment of the present invention. More specifically, FIG. 3c illustrates a preferred manner in which the switch controller transmits a message to a call transferee to indicate the status of the call transferer's telephone. The flow chart of FIG. 3c is similar to the flow chart of FIG. 3b except in this preferred operational embodiment the switch controller, rather than the user, determines and selects the message that is provided to the call transferee. At block 400, the flow chart depicts the user entering the call transfer number, similar to the operation at block 300 of FIG. 3b.

At blocks 410 and 420, the flow chart depicts an incoming call designated for the call transferor intercepted by the switch controller in accordance with conventional operation.

At block 430 the switch controller determines the status of the call transferer's telephone, e.g., busy, no answer, out of service, etc. At block 440, a message is retrieved from the switch controller's memory, which message corresponds to the determined telephone status. At block 450, the retrieved message is transmitted to the call transferee along with the incoming call. This indicates to the call transferee the reason for the call transfer. This indication is preferably accomplished using the status indicator (171 of FIG. 2).

At block 460, reversion of the call transfer function is illustrated.

It will be understood by the those skilled in the art that various modifications and changes may be made to the present invention without departing from the spirit and scope thereof.

What is claimed is:

1. A telephone communications system, comprising:
   switch control means for intercoupling a plurality of telephone devices and for activating at least one prerecorded message of a plurality of prerecorded messages in response to initiated telephone calls, including:
      means for providing at least one prerecorded message, wherein one of the prerecorded messages is a help message for access by a first telephone device;
      means for providing telephone call transfers from the first telephone device to a second telephone device; and
      means for communicating data to the second telephone device;
   the first telephone device having means for designating a prerecorded message at the means for providing prerecorded messages; and
   the second telephone device having means for indicating, in response to a telephone call transfer from the first telephone device and in response to data from the means for communicating data, a prerecorded message designated by the means for designating a prerecorded message.

2. The telephone communications system of claim 1 wherein the means for indicating are light emitting diodes.

3. The telephone communications system of claim 1 wherein the means for designating a prerecorded message is a keypad integral to the first telephone device.

4. The telephone communications system of claim 1 wherein the data is a telephone number.

5. The telephone communications system of claim 1 wherein the data is a status indication of the first telephone device.

* * * * *